US 8,452,961 B2

(12) United States Patent
Song et al.

(10) Patent No.: US 8,452,961 B2
(45) Date of Patent: May 28, 2013

(54) METHOD AND SYSTEM FOR AUTHENTICATION BETWEEN ELECTRONIC DEVICES WITH MINIMAL USER INTERVENTION

(75) Inventors: Yu Song, Pleasanton, CA (US); Doreen Cheng, San Jose, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1007 days.

(21) Appl. No.: 11/713,522

(22) Filed: Mar. 1, 2007

(65) Prior Publication Data

US 2007/0214356 A1    Sep. 13, 2007

Related U.S. Application Data

(60) Provisional application No. 60/780,397, filed on Mar. 7, 2006.

(51) Int. Cl.
*H04L 9/32* (2006.01)

(52) U.S. Cl.
USPC ............................ 713/170; 713/156; 726/5

(58) Field of Classification Search
USPC .............................................................. 726/5
See application file for complete search history.

(56) References Cited

U.S. PATENT DOCUMENTS

| | | | |
|---|---|---|---|
| 5,911,143 A | 6/1999 | Deinhart et al. | |
| 6,073,242 A | 6/2000 | Hardy et al. | |
| 6,202,066 B1 | 3/2001 | Barkley et al. | |
| 6,269,405 B1 | 7/2001 | Dutcher et al. | |
| 6,269,406 B1 | 7/2001 | Dutcher et al. | |
| 6,311,205 B1 | 10/2001 | Dutcher et al. | |
| 6,357,010 B1 | 3/2002 | Viets et al. | |
| 6,434,607 B1 | 8/2002 | Haverstock et al. | |
| 6,442,695 B1 | 8/2002 | Dutcher et al. | |
| 6,453,353 B1 | 9/2002 | Win et al. | |
| 6,574,736 B1 | 6/2003 | Andrews | |
| 6,640,307 B2 | 10/2003 | Viets et al. | |
| 6,651,096 B1 | 11/2003 | Gai et al. | |
| 6,654,794 B1 | 11/2003 | French | |

(Continued)

FOREIGN PATENT DOCUMENTS

WO    2004079594    9/2004

OTHER PUBLICATIONS

U.S. Non-Final Office Action for U.S. Appl. No. 11/056,221 mailed Dec. 8, 2008.

(Continued)

*Primary Examiner* — Jeffrey D Popham
*Assistant Examiner* — Gary Gracia
(74) *Attorney, Agent, or Firm* — Kenneth L. Sherman, Esq.; Michael Zarrabian, Esq.; Sherman & Zarrabian LLP

(57) ABSTRACT

A method and system for authentication between electronic devices with reduced user intervention is provided. An authentication process for electronic devices (e.g., CE devices) establishes ownership for secure communication, with reduced user involvement. Device ownership trust establishment allows secured/authenticated communication between electronic devices. The process binds a device to an owner such that the authentication only verifies the authenticity of a device, and verifies the ownership of the device to ensure authentication. This ensures that a device is a valid device that has not been tampered with, and ensures a device has a trusted owner. Ownership binding to a device can be verified and established by trusted third parties without user intervention.

16 Claims, 6 Drawing Sheets

U.S. PATENT DOCUMENTS

| | | | |
|---|---|---|---|
| 6,665,303 | B1 | 12/2003 | Saito et al. |
| 6,948,076 | B2 | 9/2005 | Saito |
| 6,970,127 | B2 | 11/2005 | Rakib et al. |
| 7,081,830 | B2 | 7/2006 | Shimba et al. |
| 7,225,263 | B1 | 5/2007 | Clymer et al. |
| 7,325,057 | B2 | 1/2008 | Cho et al. |
| 7,380,271 | B2 | 5/2008 | Moran et al. |
| 7,421,740 | B2 | 9/2008 | Fey et al. |
| 7,424,475 | B2 | 9/2008 | Ishii et al. |
| 7,437,755 | B2 | 10/2008 | Farino et al. |
| 7,478,094 | B2 | 1/2009 | Ho et al. |
| 7,536,709 | B2 | 5/2009 | Shitano |
| 7,580,877 | B1* | 8/2009 | Argenbright ............... 705/36 R |
| 7,688,791 | B2 | 3/2010 | Fujita |
| 7,715,412 | B2 | 5/2010 | Afshar et al. |
| 2001/0033554 | A1 | 10/2001 | Ayyagari |
| 2001/0034745 | A1* | 10/2001 | Ishii et al. ................. 707/514 |
| 2002/0078161 | A1 | 6/2002 | Cheng |
| 2002/0103850 | A1 | 8/2002 | Moyer |
| 2002/0112045 | A1 | 8/2002 | Nirkhe et al. |
| 2003/0055792 | A1* | 3/2003 | Kinoshita et al. ............. 705/67 |
| 2003/0084311 | A1* | 5/2003 | Merrien et al. ............... 713/191 |
| 2003/0163701 | A1* | 8/2003 | Ochi et al. ................. 713/175 |
| 2004/0059924 | A1* | 3/2004 | Soto et al. .................. 713/186 |
| 2004/0125402 | A1 | 7/2004 | Kanai et al. |
| 2004/0205172 | A1 | 10/2004 | Kim |
| 2004/0242209 | A1* | 12/2004 | Kruis et al. ............... 455/414.1 |
| 2004/0249768 | A1 | 12/2004 | Kontio et al. |
| 2005/0033994 | A1* | 2/2005 | Suzuki ....................... 713/202 |
| 2005/0055567 | A1* | 3/2005 | Libin et al. ................. 713/200 |
| 2005/0066024 | A1 | 3/2005 | Crocitti et al. |
| 2005/0086532 | A1* | 4/2005 | Lotspiech et al. ............. 713/201 |
| 2005/0099982 | A1 | 5/2005 | Sohn et al. |
| 2005/0108556 | A1 | 5/2005 | DeMello et al. |
| 2005/0120215 | A1* | 6/2005 | Lehew et al. ............... 713/171 |
| 2005/0144481 | A1 | 6/2005 | Hopen et al. |
| 2005/0172116 | A1* | 8/2005 | Burch et al. ................. 713/155 |
| 2005/0245233 | A1* | 11/2005 | Anderson ................. 455/411 |
| 2005/0246533 | A1* | 11/2005 | Gentry ....................... 713/170 |
| 2005/0257055 | A1* | 11/2005 | Anderson ................. 713/170 |
| 2005/0273399 | A1* | 12/2005 | Soma et al. ................. 705/26 |
| 2005/0277412 | A1* | 12/2005 | Anderson et al. ........... 455/435.1 |
| 2005/0286722 | A1* | 12/2005 | Aboba et al. .............. 380/277 |
| 2006/0014520 | A1* | 1/2006 | Anderson et al. ............. 455/408 |
| 2006/0026421 | A1* | 2/2006 | Gasparini et al. ............. 713/156 |
| 2006/0045267 | A1* | 3/2006 | Moore et al. ............... 380/247 |
| 2006/0080534 | A1* | 4/2006 | Yeap et al. ................. 713/176 |
| 2006/0085634 | A1* | 4/2006 | Jain et al. .................. 713/156 |
| 2006/0129818 | A1* | 6/2006 | Kim et al. .................. 713/171 |
| 2006/0143295 | A1* | 6/2006 | Costa-Requena et al. .... 709/227 |
| 2006/0153072 | A1 | 7/2006 | Bushmitch et al. |
| 2006/0165060 | A1* | 7/2006 | Dua .......................... 370/352 |
| 2006/0167820 | A1* | 7/2006 | Jeong et al. ................. 705/67 |
| 2006/0177066 | A1* | 8/2006 | Han et al. .................. 380/277 |
| 2006/0182045 | A1* | 8/2006 | Anderson ................. 370/260 |
| 2006/0184530 | A1 | 8/2006 | Song et al. |
| 2006/0185004 | A1 | 8/2006 | Song et al. |
| 2006/0190621 | A1* | 8/2006 | Kamperman et al. ........ 709/245 |
| 2006/0190991 | A1* | 8/2006 | Iyer ........................... 726/3 |
| 2006/0195893 | A1* | 8/2006 | Caceres et al. ............... 726/8 |
| 2006/0200480 | A1* | 9/2006 | Harris et al. ................. 707/101 |
| 2006/0253584 | A1* | 11/2006 | Dixon et al. ................. 709/225 |
| 2007/0005955 | A1* | 1/2007 | Pyle et al. ................. 713/156 |
| 2007/0022479 | A1 | 1/2007 | Sikdar et al. |
| 2007/0112676 | A1* | 5/2007 | Kontio et al. ............... 705/50 |
| 2007/0130617 | A1* | 6/2007 | Durfee et al. ............... 726/5 |
| 2007/0168293 | A1* | 7/2007 | Medvinsky ................. 705/57 |
| 2007/0214241 | A1 | 9/2007 | Song et al. |
| 2007/0288487 | A1 | 12/2007 | Song et al. |
| 2007/0288632 | A1 | 12/2007 | Kanaparti et al. |
| 2008/0294559 | A1 | 11/2008 | Wield et al. |

OTHER PUBLICATIONS

U.S. Non-Final Office Action for U.S. Appl. No. 11/810,009 mailed Jul. 8, 2009.

"Open Digital Rights Language (ODRL) Version 1.1," W3C Note, Sep. 19, 2002, http://www.w3.org/TR/2002/NOTE-odrl-20020919/, United States.

SyncML—"Sync Protocol, Version 1.0," http://www.syncml.org/docs/syncml_protocol_v10_20001207.pdf, pp. 1-60, Dec. 7, 2000, United States.

Jeong, J. et al., "An XML-Based Single Sign-on Scheme Supporting OSGi Framework," Consumer Electronics, 2005, pp. 31-32, 2005 Digest of Technical Papers, United States.

Arnold, J. et al., "Single Sign On-Funktionalitat in dezentralen Umgebungen," IP.com Journal, Jul. 23, 2003, p. 97, West Henrietta, NY, United States.

Jeong, J. et al., "A XML-Based Single Sign-on Scheme Supporting Mobile and Home Network Service Environments," IEEE Transactions on Consumer Electronics, Nov. 2004, pp. 1081-1086, vol. 50, No. 4, IEEE Service Center, New York, NY, United States.

Notification of Transmittal of the International Search Report and the Written Opinion of the International Searching Authority; PCT/KR2007/002766, dated Sep. 12, 2007, Korean Intellectual Property Institute, Republic of Korea.

Notification of Transmittal of the Intenational Search Report and the Written Opinion of the International Searching Authority; PCT/KR2007/002772, dated Sep. 18, 2007, Korean Intellectual Property Institute, Republic of Korea.

Wang, O. et al., "An Inter-application and Inter-client Priority-based OoS Proxy Architecture for Heterogeneous Networks," Proceedings of the 10th IEEE Symposium on Computer and Communications ISCC, Jun. 2005, pp. 819-824, IEEE Publishing, New York, NY, United States.

Greenwald, S.J. et al., "A New Security Policy for Distributed Resource Management and Access Control," ACM Special Interest Group on Security, Audit, and Control, 1996, pp. 74-86, ACM, New York, NY.

U.S. Non-Final Office Action for U.S. Appl. No. 11/809,016 mailed Jun. 25, 2009.

* cited by examiner

METHOD AND SYSTEM FOR AUTHENTICATION BETWEEN ELECTRONIC DEVICES WITH MINIMAL USER INTERVENTION

RELATED APPLICATION

This application claims priority from U.S. Provisional Patent Application Ser. No. 60/780,397, filed Mar. 7, 2006, incorporated herein by reference.

FIELD OF THE INVENTION

The present invention relates to communication between electronic devices, and in particular, to communication between consumer electronic (CE) devices.

BACKGROUND OF THE INVENTION

The proliferation of the Internet has inspired numerous smart-home electronic applications in such areas as home security, communication, entertainment, healthcare, as well as sharing rich digital assets with families and friends anywhere around the globe.

Increasingly, however, damaging security attacks and privacy invasions have raised the degree of urgency for protecting the security of networked electronic devices. This includes home networked electronic devices such as CE devices, and the privacy of the information stored on such devices.

For networked electronic devices in a home, providing security involves performing authentication by verifying the identity of a party who is attempting to access home devices, services and/or information. Authentication between two electronic devices involves verifying that both devices posses a shared secret and, therefore, can trust each other. Once authenticated, the devices can establish a trust relationship.

Conventional authentication mechanisms can be categorized into two methods: shared secret based authentication and certification based authentication. A shared secret is a method that requires a pre-defined secret to be distributed among devices such that when authentication is required among them, the secret is exchanged. A shared secret may be distributed by a courier, by email and by direct phone call. The difficulty of a shared secret is that securely distributing the secret is a difficult problem and there is no satisfactory, automatic way of distributing the secret without malicious interception.

The home network environment poses more difficulties. The most common case a user encounters is the Wired Equivalent Privacy (WEP) key set-up for wireless access points (APs). To set up a WEP key for a wireless AP, a user is required to input the WEP key to the wireless AP via a computer terminal. At a later time, if the user wishes to set-up a wireless device that can connect to the wireless AP, the user must input the same WEP key to the wireless device. In other words, the user is required to distribute the secret (WEP key) among the wireless AP and wireless devices. This typically requires the user to use a keyboard which is not commonly provided by CE devices.

As a result, a variety of methods have been proposed in an attempt to avoid such issues. One example is a challenge/response scheme that requires a challenger to encrypt a randomly generated challenge with a shared secret key, and send it to the responder. The responder decrypts the challenge using the shared secret key, and sends back the response that is also encrypted with the shared secret key.

Another common way of authentication is to use public key infrastructure (PKI), which provides a certificate authority (CA) that all entities (devices, persons, organizations, etc.) trust. The CA generates certificates for entities, wherein a certificate includes the Distinguished Name (DN) of the entity and the public key of the entity. A public and private key are created simultaneously by the CA. The private key is given only to the requesting party and the public key is made publicly available (as part of a digital certificate) in a directory that all parties can access. The private key is never shared with anyone or sent across the Internet.

For example, entity A can use its private key to decrypt a message that has been encrypted by entity B using entity A's public key, wherein entity B can find entity A's public key from a public directory. Thus, if entity A sends a message to entity B, then entity B can find the public key (but not the private key) of entity A from a central administrator, and encrypt a message to entity A using entity A's public key. When entity A receives the message, entity A decrypts it with entity A's private key.

In addition to encrypting messages (which ensures privacy), entity A can authenticate itself to entity B (so that entity B knows that it is really entity A that sent the message), by using entity A's private key to sign the message. When entity B receives it, entity B can use the public key of entity A to verify it. When entity A tries to authenticate entity B, entity A asks for entity B's certificate. If the verification process succeeds, entity A is sure that entity B is what it claims to be.

The PKI approach has wide commercial applications, for example, on the Web using the HTTPS protocol. This is because a service provider can bind its name with the certificate when it applies for the certificate from the CA. For a home electronic device, however, the binding of its owner and application for the certificate for the device is a tedious and potentially costly step because the CA most likely charges a fee for the certificate and must perform a time consuming verification of the owner and device information. The transfer of such devices among different owners further complicates and lengthens the certificate issuing problem. There is, therefore, a need for a method and system for simplified secure communication between electronic devices.

BRIEF SUMMARY OF THE INVENTION

The present invention provides a method and system for authentication between electronic devices with reduced user intervention. In one implementation, an authentication process is provided for electronic devices (e.g., CE devices) for establishing ownership in secure communication, with reduced user involvement. A process for device ownership trust establishment is provided that allows secured/authenticated communication between electronic devices (e.g., CE devices), requiring essentially minimal user intervention.

A device is bound to an owner such that the authentication only verifies the authenticity of a device, and verifies the ownership of the device to ensure authentication. Such authentication ensures a device is a valid device that has not been tampered with, and ensures a device has a trusted owner.

The ownership binding to a device can be verified and established by trusted third parties without user intervention. Only under rare circumstance is user intervention required. After the ownership is established and the device is connected to a network, a newly purchased device then establishes trust with the devices already in the network, again without the need for user intervention.

These and other features, aspects and advantages of the present invention will become understood with reference to the following description, appended claims and accompanying figures.

DETAILED DESCRIPTION OF THE INVENTION

The present invention provides a method and system for authentication between electronic devices with reduced user intervention. In one implementation, an authentication process is provided for electronic devices (e.g., CE devices) for establishing ownership in secure communication, with reduced user involvement. A process for device ownership trust establishment is provided that allows secured/authenticated communication between electronic devices (e.g., CE devices), requiring essentially minimal user intervention.

Unlike conventional approaches, the present invention binds a device to an owner such that the authentication only verifies the authenticity of a device, and verifies the ownership of the device to ensure authentication. Such authentication ensures a device is a valid device that has not been tampered with, and ensures a device has a trusted owner. Unlike conventional approaches, according to the present invention the ownership binding to a device can be verified and established by trusted third parties without user intervention. Only under rare circumstance is user intervention required. Example implementations and variations of an authentication system and method according to the present invention are now described.

Increasingly, consumers use credit cards for purchases, including CE device purchases. Before issuing a credit card to a user, a credit card company proceeds with a rigorous background and an identity check of the applicant consumer. The personal information collected from an applicant includes name, address, telephone, email address, birth date, social security number (SSN), etc. Some consumers also use checks to pay for purchases. As with credit cards, a bank also requires an applicant to provide name, address, email address, telephone, birth date and a SSN to open accounts.

Using a credit card or a check for purchasing CE devices presents an opportunity to bind a CE device with the owner. In one example, it is assumed that the manufacturer of a device generates a secret (code) and stores the secret in a secured area, e.g., a secured ROM in the device. The secret is also stored in a secured server at the manufacturer's site, e.g., the registration server for the purchased products. This secret will be used for the device to identify itself whenever the device attempts to access services from the manufacturer after the device is purchased. Typically the device should use a secure link such as secure sockets layer (SSL) to identify itself.

Figure 1:
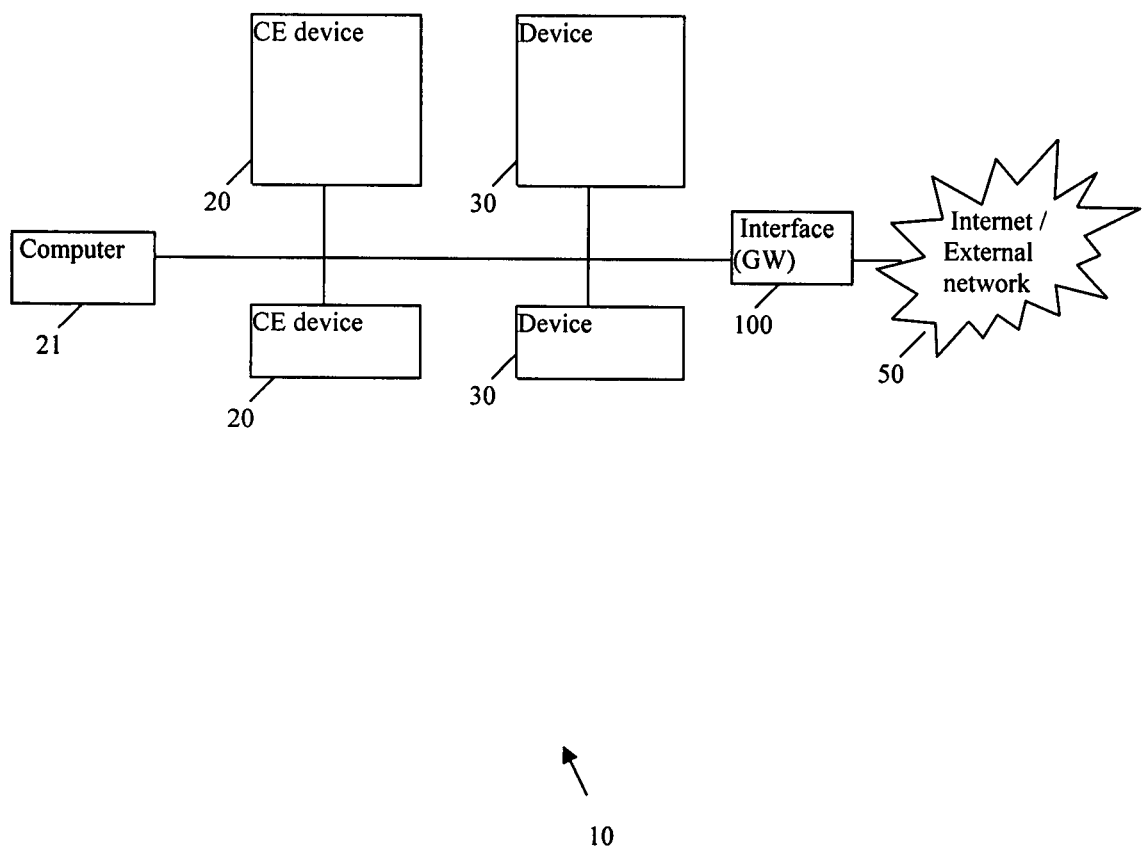
FIG. 1 shows an example network containing electronic devices, embodying aspects of the present invention.

FIG. 1 shows a functional architecture of an example network 10, such as a local network (e.g., a home network), embodying aspects of the present invention. The network 10 comprises CE devices 20 (e.g., TV, VCR, PDA, appliances, STB, cell phone, etc.) which may include content and other devices which may include content, a PC 21, and an interface such as a gateway (GW) 100 that connects the network 10 to an external network 50 (e.g., another local network, the Internet, etc.). The devices in the network 10 can implement the Universal Plug and Play (UPnP) protocol for communication therebetween. Though in the example described herein the UPnP protocol is utilized by the network 10, those skilled in the art will recognize that the present invention is useful with other network communication protocols such as Jini, HAVi, 1394, etc., can also be utilized. The devices in the network 10 of FIG. 1 are used as examples to explain the process for establishing trust between devices according to the present invention as described below.

Initially, when the home network is being established, the home owner has purchased the GW 100, and uses a secured remote terminal (e.g., a PC 21 with a SSL connection) to upload family information to the GW 100. The family information includes family member's names, email addresses for each family member, etc. This information is stored in a secured storage on the GW 100, and the GW 100 further contains a permanent certificate issued by its manufacturer (e.g., FIG. 5, wherein at a later time, a family member purchaser 101 purchases a device 102 (e.g., a CE device 20, device 30, etc.) from a retailer, described further below).

Figure 2:
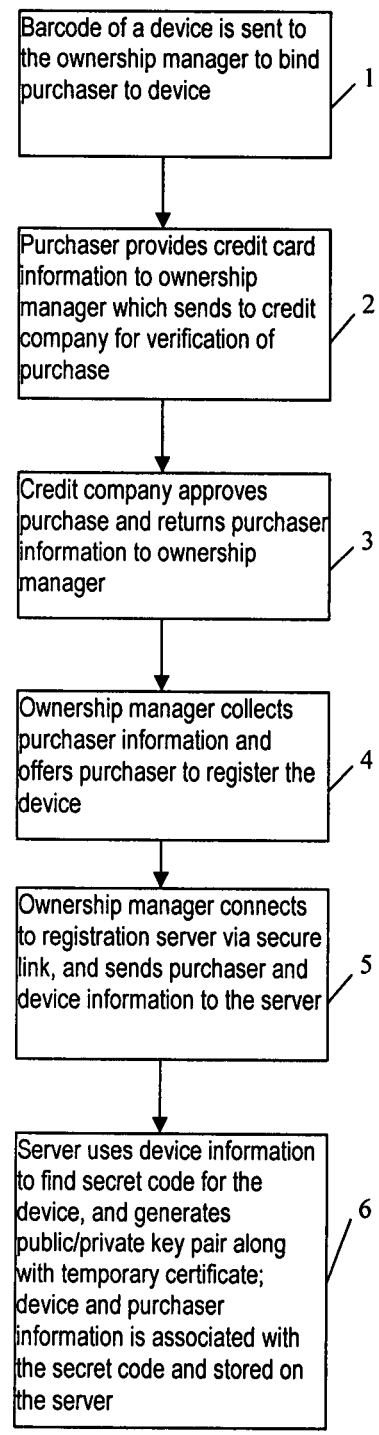
FIG. 2 shows a flowchart of steps of an example process for establishing authenticated ownership between a user purchaser and a device being purchased, according to the present invention.
Figure 3:
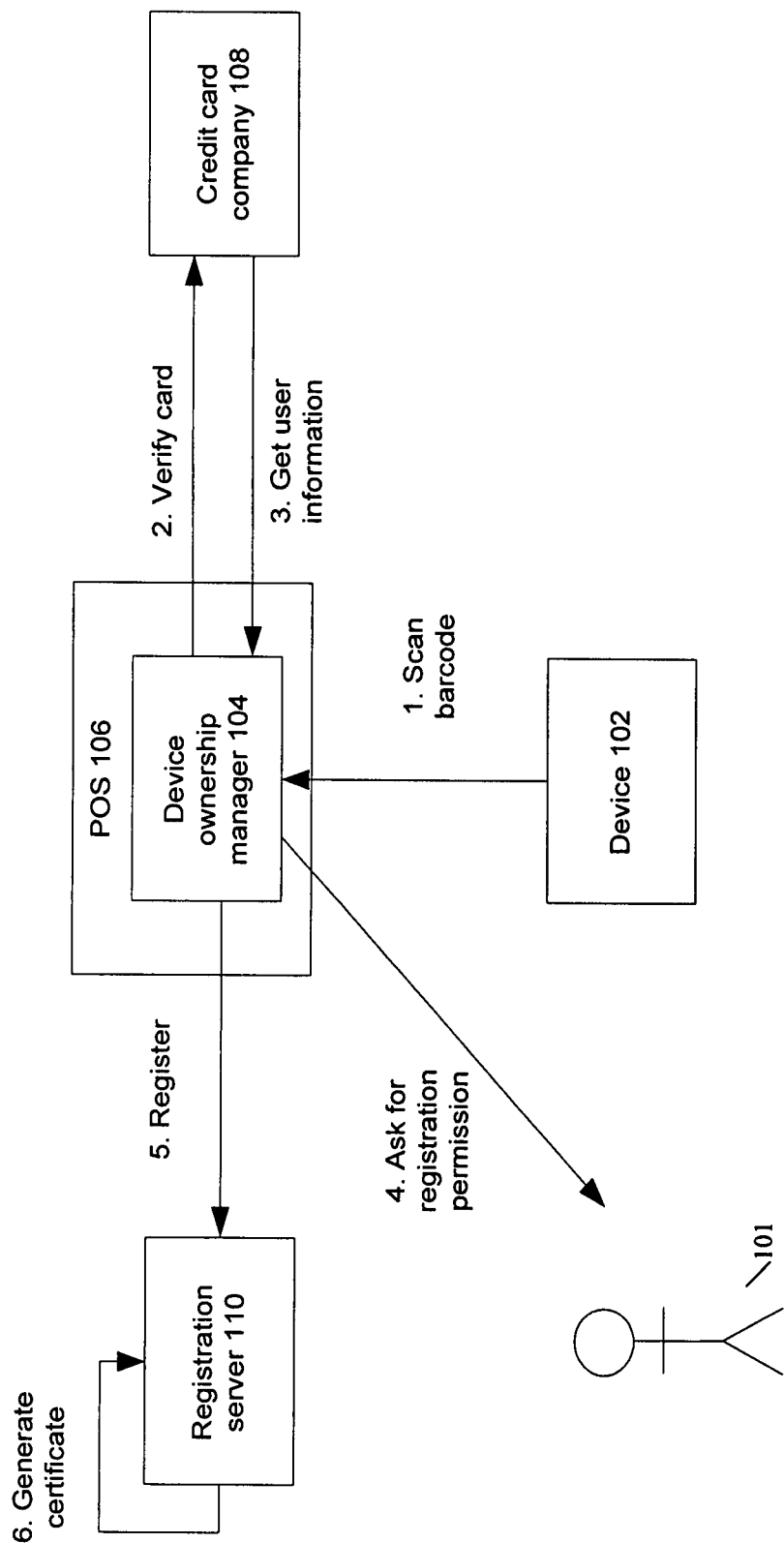
FIG. 3 shows a functional block diagram of an example system that implements the authentication process in FIG. 2, according to the present invention.
Figure 4:
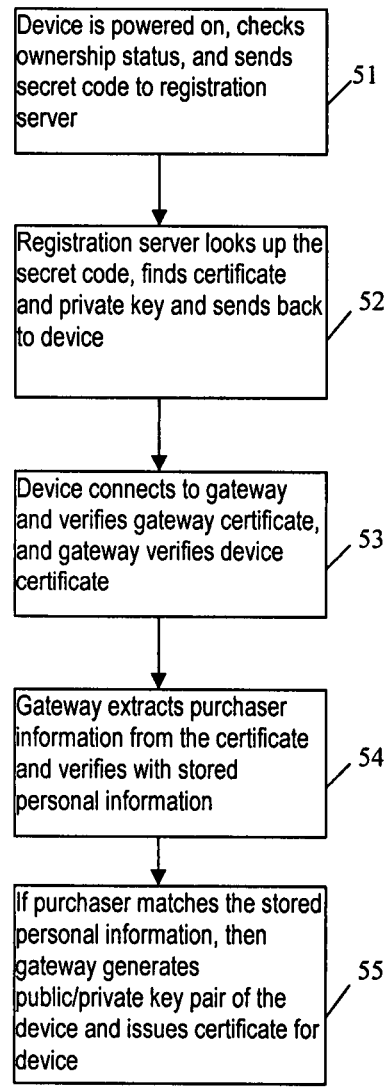
FIG. 4 shows a flowchart of steps of another example authentication process for establishing trust between the purchased device and other devices owned by the purchaser, according to the present invention.
Figure 5:
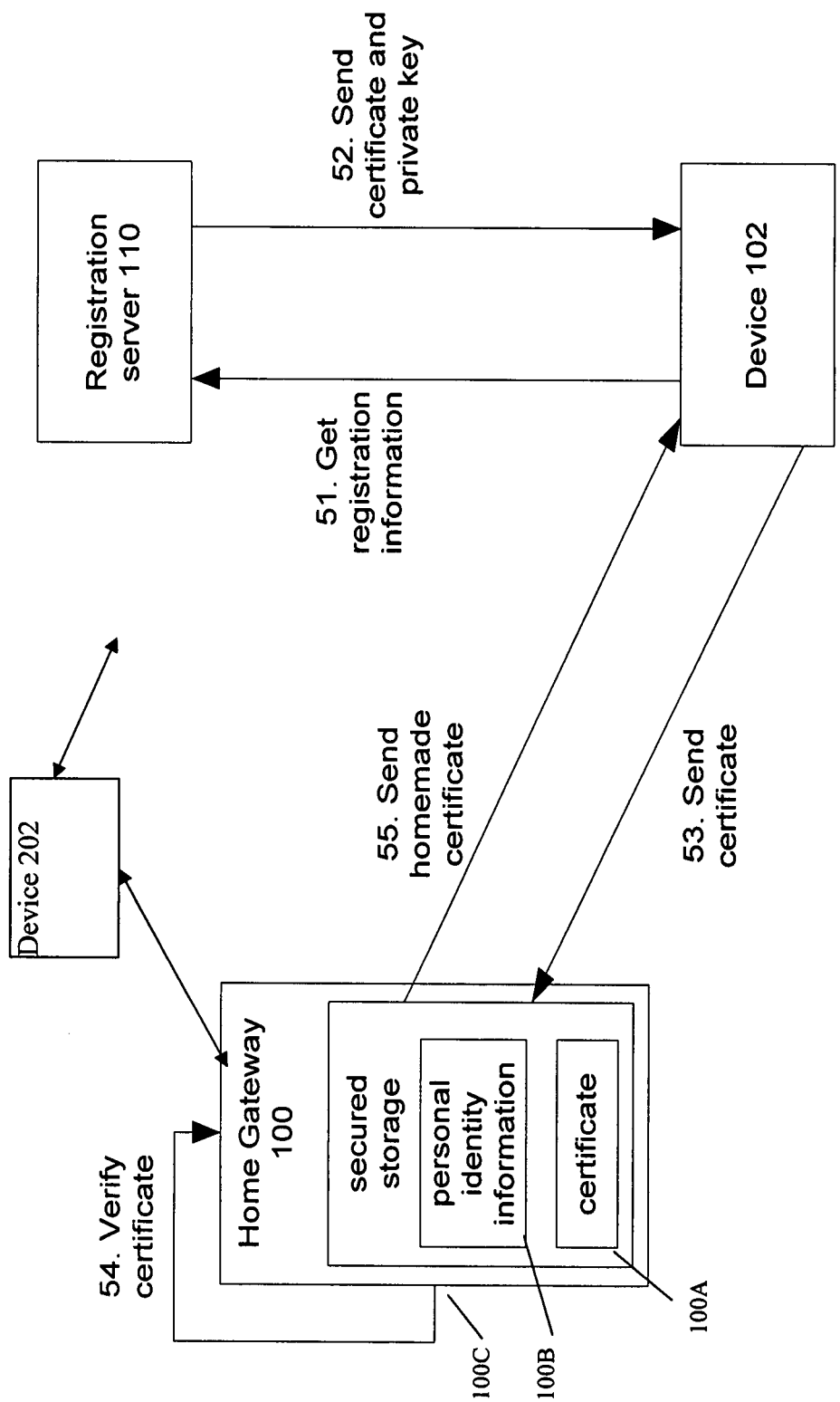
FIG. 5 shows a functional block diagram of an example system including a home network that implements the authentication process in FIG. 4, according to the present invention.

According to the present invention, the purchaser's identity information is stored on the GW 100. Then, the purchaser's identity is verified, and the ownership is established between the purchaser and the device. Further, trust is established between the newly purchased device and the devices already in the network by establishing trust with the GW 100 of the network. FIG. 2 shows example steps for establishing ownership between the purchaser and the device. FIG. 3 shows an example implementation of the steps in FIG. 2. Further, FIG. 4 shows example steps for establishing trust between the newly purchased device and the devices already in the network. FIG. 5 shows an example implementation of the steps in FIG. 4.

Referring to FIGS. 2 and 3, a purchaser 101 at a checkout point of a retail store uses his credit card to purchase an electronic device 102 (FIG. 3). For clarity of explanation, the steps in FIG. 2 are also shown in FIG. 3. The purchaser is bound to the device 102 according to the following steps (FIG. 2):

Step 1: At the checkout point, a sales person scans the barcode on the device 102. The barcode is sent to an ownership manager 104 which in this example comprises a software module which binds the purchaser 101 with the device 102. The ownership manager 104 resides on a point of sale (POS) terminal 106.

Step 2: The purchaser 101 swipes the credit card on the POS 106. The ownership manager 104 receives the credit card account number and sends it to the credit card company 108 for verification.

Step 3: The credit card company 108 verifies and approves the purchase, and returns the purchaser information on the record (i.e., name, telephone, email address, mailing address, etc.) to the ownership manager 104.

Step 4: The ownership manager 104 collects the information from the credit card company 108, and asks the purchaser 101 whether the purchaser wishes to register the device 102.

Step 5: If the purchaser approves the request for product registration, the ownership manager 104 uses a secured connection (e.g., a SSL with client verification) to connect to a trusted entity, such as the product manufacturer's registration server 110, and sends to the registration server 110 the identification (e.g., serial number) of device 102, along with identification information about the purchaser 101 obtained from the credit card company 108. In this step, it is assumed that the manufacturer and the retailer have already established trust such that the client verification succeeds before a secured connection is established.

Step 6: The registration server 110 uses the device identification (e.g., a serial number) to find the secret code previously generated for the device 102 (e.g., preinstalled by the manufacturer, preferably permanently). The server 110 also generates a public/private key pair which will be used for the device 102 (step 53 in FIG. 5) and issues a temporary certificate for the device 102 signed by the manufacturer. The temporary certificate includes the public key for the device 102, and the identification (e.g., name, telephone, address and email address, etc.) of the purchaser 101. This device information and purchaser information are associated with the secret code and stored on the registration server 110 to be retrieved by the device 102 at a later time using the secret code as the device's identification. At this time, the purchaser 101 is bound to the device 102.

The device registration is now completed and the purchaser 101 is bound to the device 102. The purchaser 101 then connects the purchased device 102 to his home network and powers on the device 102. The flowchart of FIG. 4 in conjunction with the functional block diagram of network 200 in FIG. 5 (an example of network 10 in FIG. 1), describes establishing trust between the device 102 and the home GW 100. To facilitate understanding, the above steps in FIG. 4 are also marked on the control/flow arrows in FIG. 5 between blocks 100, 102 and 110.

Step 51: Device 102 is connected to the network 200 and is powered-on. At this time the device is connected to the Internet via the GW 100. The device 102 checks the internal state of ownership of itself and finds that the ownership has been established, but has not been verified (acknowledged) by device 102 itself. To verify the ownership, the device 102 securely connects (e.g., using a SSL) to a trusted entity, such as the manufacturer's registration server 110 using the address that has been built into the device 102 during the manufacturing process, with reduced or no user intervention. The device 102 sends its secret code to the registration server 110 at the manufacturer's site. The secret code has been securely stored on the device 102 by the device manufacturer.

Step 52: The registration server 110 looks up the secret code in its database and finds the device's temporary certificate and the public/private key pair generated during the product registration process, and sends the certificate and the private key back to the device 102 over the secured link.

Step 53: The device 102 then establishes a secured connection (e.g., SSL) using the public/private key obtained from the server 110 and connects to the GW 100 using this connection. During the establishment of the secured connection, the device 102 provides its temporary certificate to the GW 100, and the GW 100 provides its permanent certificate 100A to the device 102. The device 102 verifies the permanent certificate 100A of the GW 100 using an Online Certificate Status Protocol (OCSP) with the server 110, and the GW 100 verifies the temporary certificate of the device 102 using OCSP with the server 110. OCSP is an Internet protocol used for obtaining the revocation status of an X.509 digital certificate. It is described in RFC 2560 and is on the Internet standards track. OCSP was created as an alternative to certificate revocation lists (CRLs), specifically addressing certain problems associated with using CRLs in a PKI. Messages communicated via OCSP are encoded in ASN.1 and are usually communicated over HTTP. The "request/response" nature of these messages leads to OCSP servers being termed OCSP responders.

Step 54: The GW 100 extracts the purchaser's information from the device's temporary certificate, and verifies that information with the stored family member personal information 100B in a secured storage 100C in the GW 100.

Step 55: If the purchaser matches one of the family members, the GW 100 trusts that the device 102 can be trusted and generates a public/private key pair for the device 102 and issues a permanent certificate for the device 102 (the certificate contains information, e.g., about the home, such as home address, telephone, etc.). The GW 100 then sends the certificate and the generated private/public key pair to the device 102. The certificate and the public/private key pair are used by the device 102 at a later time for communication with other devices. For example, when the device 102 desired to make a SSL connection to other devices in network, the device 102 presents the certificate to the other devices, as well as uses the private/public key for data decryption/encryption. The certificate is a proof that the device 102 belongs to a certain home network, because the certificate is issued by a certain home gateway.

FIG. 5 shows another device 202 which can be added to the home network using a procedure as described above. The device 202 first establishes trust between the GW 100 and itself by obtaining the certificate and public/private key pair from the GW 100. Then during a communication link set-up stage, the device 202 and the device 102 exchange the certificates and use their respective public/private key pairs for data encryption/decryption. The above steps are equally applicable to purchases made by check, wherein a bank or credit company has the purchaser information that is used in steps 1-6 and steps 51-55 above.

Though the term family member is used herein, any person already listed in the personal identity information 100B can be involved. Further, though the examples herein utilize a home network, the present invention is applicable for any group whose members have established trust with a network that connects the devices that have established trust among themselves.

The present invention takes into account that not all purchases are through credit cards or checks. Consumers sometimes prefer paying cash, or during a purchase, they do not wish to register devices automatically. In such situations, user intervention is required to establish trust between a device and an existing home GW. If a user has not registered the device during the purchase, then when the device contacts the manufacturer's server, it cannot obtain the registration information back. This is in contrast to the aforementioned trust establishment procedure. In this case the device multicasts its presence in the home network. The owner can check the status of his/her home network on the GW via a remote console, such as a browser on a PC. When using the remote console the user finds that the new device is trying to connect to the home network, the user can simply click "Yes" on the trust establishment user interface to inform the GW that the new device is trusted and is one of the approved devices for the home network. The gateway can then proceed to issue a homemade certificate for the new device. The new device uses the GW 100's public key (obtained from the GW's permanent certificate) to establish a symmetric key, and uses the symmetric key to decrypt the GW's generated public/private key pair and certificate from the GW 100, and therefore, establishes a trust between the GW 100 and the new device.

Another alternative is that when a new device is connected into a home network, the home network can use a remote console, such as a browser on a PC to input user information into the device, and the device then registers the user information to the manufacturer's registration server to obtain a temporary certificate and private/public key pair. In this case, it is also required that the device provides a software capability and interface to enable a user to specify this information and use it for the registration. For example, the device can provide a remote user interface (UI) for the specification and capabilities to accept the user input from a network.

Further, an owner may transfer such a device to another user. To erase user information from the device, the owner can simply push a button, e.g., a "factory reset" button, on the device before transferring the device. The new owner of the device then sets-up the ownership of the device by using the procedures described further above. The secret code remains the same since it is stored in a secured ROM in the device.

Figure 6:
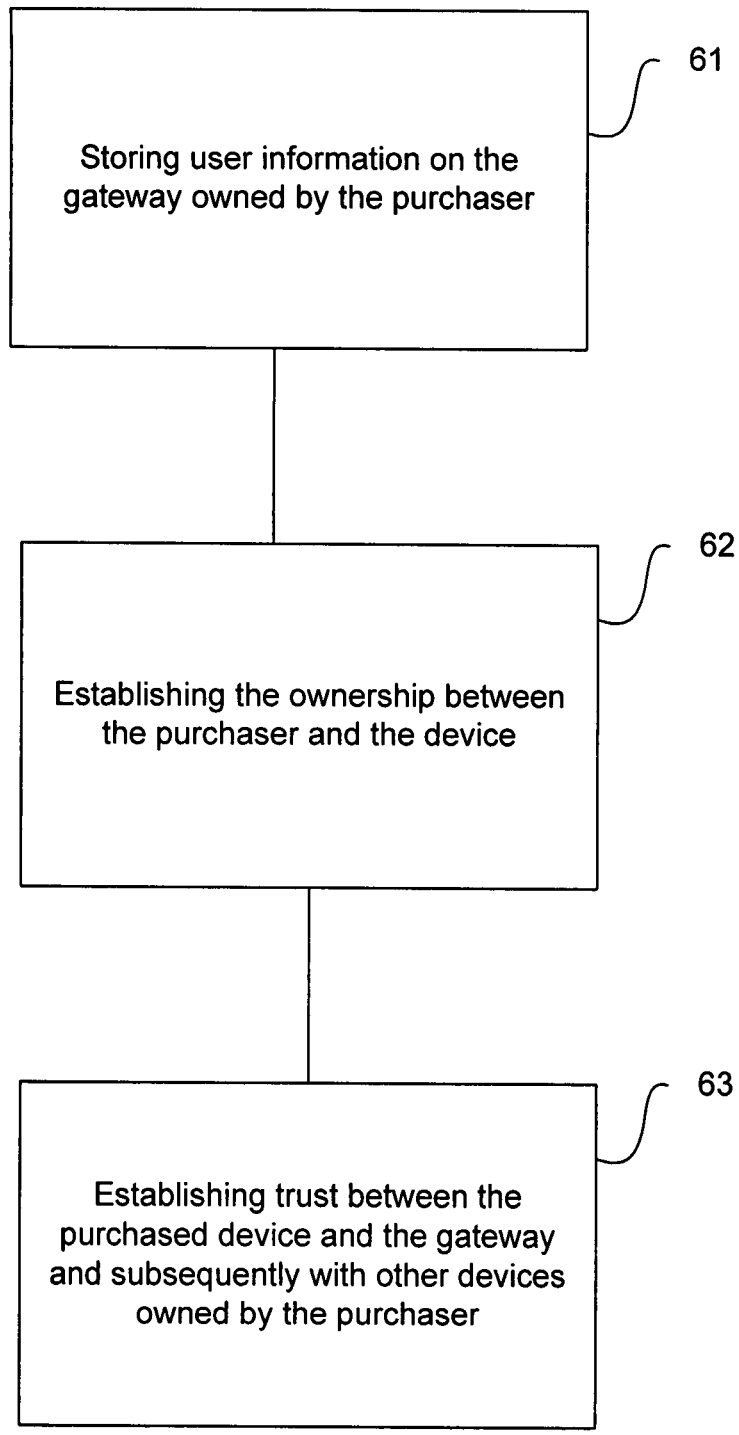
FIG. 6 shows a flow chart of example steps in establishing trust between devices, according to the present invention.

FIG. 6 summarizes the steps of a trust establishment process according to an embodiment of the present invention. In step 61, the purchaser's identity information is stored on the gateway. In step 62, the purchaser's identity is verified and the ownership is established between the purchaser and the device. In step 63, trust is established between the newly purchased device and the devices already in the network by establishing trust with the gateway of the network.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for authentication between electronic devices in a home network including a first device storing personal identity information for at least one user of the home network, comprising:
    1) generating a binding associating purchaser information, a secret device code, and certificate information for a newly purchased second device prior to installation of the second device in the home network, including:
    receiving purchaser information from a credit entity in response to a sale of the second device;
    receiving a pre-determined device identification information for the second device obtained at the point of sale of the second device;
    binding ownership of the second device to the user via an external registration entity using the purchaser information from the credit entity and the pre-determined device identification information from the second device obtained by a device ownership manager;
    wherein binding ownership of the second device includes:
    associating the purchaser information with a secret code associated with the pre-determined device identification for the second device and generating temporary certificate information for the second device including personal identification information for the purchaser of the second device; and
    2) providing, after the second device is installed in the home network, the temporary certificate information to the second device for the second device to authenticate itself with the home network, including:
    receiving a request from the second device installed in the home network, the request providing the secret code of the second device; and
    in response to the request from the second device returning a reply to the home network that includes the temporary certificate information to permit an authentication of the second device within the home network based on matching purchaser identification information in the temporary certificate with the previously stored personal identity information of the first device trusted by the home network.

2. The method of claim 1 wherein binding ownership of the second device includes:
    during acquisition of the second device by a user purchaser, using device identification and purchaser information in obtaining approval for acquisition of the second device; and
    upon approval for acquisition and upon purchaser permission, performing registration in the external registration entity by:
    generating an authentication key pair and the temporary certificate for the second device; and
    associating the purchaser information with a preinstalled secret code in the second device, for later retrieval by the second device and using the secret code as the device identification.

3. The method of claim 2 wherein the external registration entity comprises a registration server of the manufacturer of the second device.

4. The method of claim 2 wherein during acquisition the purchaser provides bank checking information, such that obtaining approval for the acquisition further includes providing the payment funds information to a banking entity for verification of purchase.

5. The method of claim 1 wherein during acquisition the purchaser provides credit information, such that obtaining approval for the acquisition includes providing the credit information to a creditor entity for verification of purchase.

6. The method of claim 5 further comprising:
    upon verification, the credit entity providing purchaser information including purchaser identification; and
    utilizing the provided purchaser identification and device information in associating the purchaser information with the second device.

7. The method of claim 6 wherein performing authentication when the second device is connected to the network, further includes:
    sending the secret code of the second device to the external registration entity;
    the external registration entity using the secret code to find and send said a temporary certificate and authentication key to the second device; and the second device communicating with the first device wherein the first device verifies a certificate of the second device, and the second device verifies a certificate of the first device, such that if both certificates are not verified the authentication fails.

8. The method of claim 7 further comprising:

if both certificates are verified, then the first device extracts purchaser information from the temporary certificate of the second device and verifies the extracted purchaser information with user information stored in the first device.

9. The method of claim 8 further including:

verifying if purchaser information matches the stored user information; and if purchaser information matches the stored user information, then establishing ownership trust in the network between the first device and the second device for further information communication therebetween.

10. The method of claim 9 further including:

if purchaser information matches the stored user information, then:

the first device further generating a public/private key pair and issuing a permanent certificate for the second device;

the first device encrypting the public/private key pair and the permanent certificate for the second device, using the temporary device public key on the first device; and the second device decrypting the public/private key pair and the permanent certificate for the second device, using the temporary private key;

wherein the permanent certificate and the public/private key are used for communication with other devices in the network.

11. The method of claim 10 wherein the first device comprises a gateway and the second device comprises an electronic device.

12. The method of claim 1, wherein the user information is stored in the first device via a remote console.

13. The method of claim 1, further comprising establishing ownership between the first device and the user based on the stored user information.

14. The method of claim 1, wherein registration of the second device is completed at time of purchasing based on user information from a credit entity and second device information preinstalled on the second device.

15. The method of claim 14, wherein the second device is registered with the registration entity upon powering up a first time in the local network.

16. The method of claim 1, further comprising:

establishing trust between the first device and a third device for communication between the third device and the second device based on a purchaser of the third device matching family member information stored on the first device, wherein the first device trusts the third device and generates a public/private key pair for the third device to communicate with the second device, and the third device and the second device exchange information.

* * * * *